(12) United States Patent
Kang et al.

(10) Patent No.: US 11,658,335 B2
(45) Date of Patent: May 23, 2023

(54) SECONDARY BATTERY AND PREPARATION METHOD THEREOF, AND BATTERY MODULE, BATTERY PACK, AND APPARATUS CONTAINING SUCH SECONDARY BATTERY

(71) Applicant: Contemporary Amperex Technology Co., Limited, Ningde (CN)

(72) Inventors: Meng Kang, Ningde (CN); Xiaobin Dong, Ningde (CN); Jiazheng Wang, Ningde (CN); Libing He, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/810,610

(22) Filed: Jul. 4, 2022

(65) Prior Publication Data
US 2022/0336844 A1    Oct. 20, 2022

Related U.S. Application Data

(63) Continuation of application No. PCT/CN2020/106076, filed on Jul. 31, 2020.

(51) Int. Cl.
*H01M 4/587*    (2010.01)
*H01M 10/0525*    (2010.01)
(Continued)

(52) U.S. Cl.
CPC ..... *H01M 10/0525* (2013.01); *H01M 4/0404* (2013.01); *H01M 4/485* (2013.01);
(Continued)

(58) Field of Classification Search
CPC ........... H01M 10/0525; H01M 4/0404; H01M 4/485; H01M 4/505; H01M 4/525;
(Continued)

(56) References Cited

U.S. PATENT DOCUMENTS

| 2011/0117445 A1 | 5/2011 | Abraham |
| 2015/0104691 A1* | 4/2015 | Nakamura ........ H01M 10/0525 429/150 |

FOREIGN PATENT DOCUMENTS

| CN | 105762336 A | 7/2016 |
| CN | 108807848 A | 11/2018 |
| CN | 109286020 A | 1/2019 |

OTHER PUBLICATIONS

International Search Report received in PCT Application PCT/CN2020/106076 dated Apr. 25, 2021.

* cited by examiner

*Primary Examiner* — Cynthia K Walls
(74) *Attorney, Agent, or Firm* — Kilpatrick Townsend & Stockton LLP

(57) ABSTRACT

Embodiments provide a secondary battery and a preparation method thereof, and a battery module, battery pack, and apparatus containing such secondary battery. In those embodiments, a negative electrode plate includes a negative-electrode current collector and a negative-electrode film layer that is disposed on at least one surface of the negative-electrode current collector and that includes a negative-electrode active material. The negative-electrode active material contains graphite, and the negative electrode plate satisfies that, when the negative electrode plate and a lithium metal sheet constitute a button battery which is discharged to 5.0 mV at 0.05 C, a capacity increment curve V-dQ/dV of the button battery has a third-order lithiation phase transition peak of graphite at position 0.055V-0.085V.

18 Claims, 3 Drawing Sheets

(51) Int. Cl.
*H01M 4/04* (2006.01)
*H01M 4/485* (2010.01)
*H01M 4/505* (2010.01)
*H01M 4/525* (2010.01)
*H01M 10/04* (2006.01)
*H01M 4/02* (2006.01)

(52) U.S. Cl.
CPC ............ *H01M 4/505* (2013.01); *H01M 4/525* (2013.01); *H01M 4/587* (2013.01); *H01M 10/0427* (2013.01); *H01M 2004/021* (2013.01); *H01M 2004/027* (2013.01); *H01M 2004/028* (2013.01); *H01M 2220/20* (2013.01)

(58) Field of Classification Search
CPC ............. H01M 4/587; H01M 10/0427; H01M 2004/021; H01M 2004/027; H01M 2004/028; H01M 2220/20
See application file for complete search history.

SECONDARY BATTERY AND PREPARATION METHOD THEREOF, AND BATTERY MODULE, BATTERY PACK, AND APPARATUS CONTAINING SUCH SECONDARY BATTERY

CROSS-REFERENCE TO RELATED APPLICATIONS

This application is a continuation of International Application PCT/CN2020/106076, filed on Jul. 31, 2020 and entitled "SECONDARY BATTERY, PREPARATION METHOD THEREFOR, AND BATTERY MODULE, BATTERY PACK AGE AND DEVICE CONTAINING SAME", which is incorporated herein by reference in its entirety.

TECHNICAL FIELD

The present disclosure relates to the field of secondary battery technologies, and specifically, to a secondary battery and a preparation method thereof, and a battery module, battery pack, and apparatus containing such secondary battery.

BACKGROUND

In recent years, countries around the world are vigorously promoting development and application of new energy vehicles. Secondary batteries have been widely used in electric vehicles that are representatives of new energy vehicles by virtue of theirs advantages such as high energy density, long cycle life, pollution free, and memory effect free. However, compared with conventional fuel vehicles featured with convenient and efficient refueling, the secondary batteries are usually charged at a quite low rate and charging duration of more than 10 hours. This seriously exacerbates range anxiety of users and affects consumer experience, thereby restricting rapid popularization of electric vehicles. Therefore, how to improve a fast charging capability of the secondary batteries has become a hot research issue.

SUMMARY

Some embodiments provide a secondary battery. The secondary battery includes a negative electrode plate. The negative electrode plate includes a negative-electrode current collector and a negative-electrode film layer that is disposed on at least one surface of the negative-electrode current collector and that includes a negative-electrode active material. The negative-electrode active material contains graphite, and the negative electrode plate satisfies that, when the negative electrode plate and a lithium metal sheet constitute a button battery which is discharged to 5.0 mV at 0.05 C, a capacity increment curve V-dQ/dV of the button battery has a third-order lithiation phase transition peak of graphite at position 0.055V-0.085V.

In the secondary battery in accordance with the present disclosure, the negative-electrode active material of the negative electrode plate contains graphite, and the negative electrode plate satisfies that, when the negative electrode plate and a lithium metal sheet constitute a button battery which is discharged to 5.0 mV at 0.05 C, a resulting capacity increment curve V-dQ/dV has a phase transition peak of a transition from a fourth-order lithiation compound to a third-order lithiation compound of graphite at position 0.055V-0.085V. In this way, the negative electrode plate can have a relatively high reversible capacity, and also have a relatively high capability of de-intercalating active ions, thereby greatly increasing a moving speed of active ions between a positive electrode and a negative electrode, so that a fast charging capability is significantly improved and a cycle life is significantly prolonged, provided that the secondary battery has a relatively high energy density.

In some embodiments of this application, the capacity increment curve V-dQ/dV has the third-order lithiation phase transition peak of graphite at position 0.057V-0.077V; and optionally, the capacity increment curve V-dQ/dV has the third-order lithiation phase transition peak of graphite at position 0.061V-0.074V. When the negative electrode plate satisfies the foregoing condition, the fast charging capability of the battery can be further improved and the cycle life of the battery can be further prolonged.

In various embodiments, a peak intensity of the third-order lithiation phase transition peak of graphite is $-3$ Ah/V/g to $-15$ Ah/V/g. When the peak intensity is within an appropriate range, the negative electrode plate has a relatively high actual lithiation capacity, so that the energy density of the battery can be further increased.

In various embodiments, a median particle size by volume $D_v50$ of the negative-electrode active material satisfies $8\ \mu m \leq D_v50 \leq 16\ \mu m$, and optionally, $9.5\ \mu m \leq D_v50 \leq 14.5\ \mu m$. When $D_v50$ of the negative-electrode active material is within the given range, the fast charging capability of the battery can be further improved. In addition, the cycle life of the battery can also be improved.

In various embodiments, an areal density (AD) of the negative-electrode film layer satisfies $0.09\ kg/m^2 \leq AD \leq 0.117\ kg/m^2$; and optionally, the areal density AD of the negative-electrode film layer satisfies $0.094\ kg/m^2 \leq AD \leq 0.107\ kg/m^2$. When the areal density of the negative-electrode film layer is within the foregoing range, the energy density of the battery can be increased and the fast charging capability of the battery can be improved.

In various embodiments, a press density (PRESENT DISCLOSUre) of the negative-electrode film layer satisfies $1.5\ g/m^3 \leq PD \leq 1.7\ g/m^3$; and optionally, the press density PD of the negative-electrode film layer satisfies $1.53\ g/m^3 \leq PD \leq 1.68\ g/m^3$. When the press density of the negative-electrode film layer is within the foregoing range, the fast charging capability and cycling performance of the battery can be improved.

In various embodiments, the negative-electrode active material contains artificial graphite; and optionally, a mass percentage of the artificial graphite in the negative-electrode active material is $\geq 60\%$; and optionally, the mass percentage of the artificial graphite in the negative-electrode active material is 80% to 100%. When the negative-electrode active material satisfies the foregoing condition, the battery can achieve a higher fast charging capability and longer cycle life.

In various embodiments, the negative-electrode active material contains natural graphite; and optionally, a mass percentage of the natural graphite in the negative-electrode active material is $\leq 40\%$; and optionally, the mass percentage of the natural graphite in the negative-electrode active material is 10% to 30%. When the negative-electrode active material satisfies the foregoing condition, the fast charging capability of the battery can be further improved.

In various embodiments, the negative-electrode active material includes secondary particles; and optionally, a number percentage of the secondary particles in the negative-electrode active material is $\geq 60\%$; and optionally, the number percentage of the secondary particles in the negative-electrode active material is 80% to 100%. When the negative-electrode active material satisfies the foregoing condition, the fast charging capability of the battery can be further improved, and the cycle life of the battery can be further improved.

In various embodiments, a particle size uniformity (Uniformity) of the negative-electrode active material is 0.3 to 0.4; and optionally, the particle size uniformity (Uniformity) of the negative-electrode active material is 0.31 to 0.36. When the particle size uniformity (Uniformity) of the negative-electrode active material is within the given range, the fast charging capability of the battery can be further improved, and further the cycle life of the battery can be prolonged and the energy density of the battery can be increased.

In various embodiments, a particle size span $(D_v90-D_v10)/D_v50$ of the negative-electrode active material satisfies $1.0 \leq (D_v90-D_v10)/D_v50 \leq 1.4$, and optionally, $1.1 \leq (D_v90-D_v10)/D_v50 \leq 1.3$. When the particle size span $(D_v90-D_v10)/D_v50$ of the negative-electrode active material is within the given range, the fast charging capability of the battery can be further improved.

In various embodiments, a degree of graphitization of the negative-electrode active material is 93% to 95%; and optionally, the degree of graphitization of the negative-electrode active material is 93.5% to 94.5%. When the degree of graphitization of the negative-electrode active material is within the given range, the fast charging capability of the battery can be further improved, and the cycle life of the battery can be further prolonged.

In various embodiments, a powder OI value of the negative-electrode active material is 2.5 to 4.5; and optionally, the powder OI value of the negative-electrode active material is 3 to 4. When the powder OI value of the negative-electrode active material is within the given range, the fast charging capability of the battery can be further improved, and the cycle life of the battery can be further prolonged.

In various embodiments, a tap density of the negative-electrode active material is 0.8 g/cm$^3$ to 1.2 g/cm$^3$; and optionally, the tap density of the negative-electrode active material is 0.9 g/cm$^3$ to 1.1 g/cm$^3$. When the tap density of the negative-electrode active material is within the given range, the battery can achieve a higher energy density, and the fast charging capability of the battery can be further improved.

In various embodiments, a powder press density of the negative-electrode active material at a pressure of 30 kN is 1.65 g/cm$^3$ to 1.85 g/cm$^3$; and optionally, the powder press density of the negative-electrode active material at the pressure of 30 kN is 1.7 g/cm$^3$ to 1.8 g/cm$^3$. When the powder press density of the negative-electrode active material at the pressure of 30 kN is within the given range, the energy density of the battery can be increased.

In various embodiments, a gram capacity of the negative-electrode active material is 350 mAh/g to 360 mAh/g; and optionally, the gram capacity of the negative-electrode active material is 352 mAh/g to 358 mAh/g. By using a negative-electrode active material within this capacity range, it can be ensured that the battery has a relatively high energy density and fast charging capability.

In various embodiments, a porosity P of the negative-electrode film layer satisfies $25\% \leq P \leq 45\%$; and optionally, the porosity P of the negative-electrode film layer satisfies $28\% \leq P \leq 35\%$. When the porosity of the negative-electrode film layer is within the foregoing range, the energy density of the battery can be increased and the fast charging capability of the battery can be improved.

In various embodiments, an adhesion F between the negative-electrode film layer and the negative-electrode current collector satisfies 4.5 N/m$\leq$F$\leq$15 N/m; and optionally, the adhesion F between the negative-electrode film layer and the negative-electrode current collector satisfies 8 N/m$\leq$F$\leq$12 N/m. When the adhesion between the negative-electrode film layer and the negative-electrode current collector is within the foregoing range, the fast charging capability and cycling performance of the battery can be improved.

In various embodiments, the secondary battery includes a positive electrode plate. The positive electrode plate includes a positive-electrode current collector and a positive-electrode film layer that is disposed on at least one surface of the positive-electrode current collector and that includes a positive-electrode active material. The positive-electrode active material contains one or more of lithium nickel cobalt manganese oxide, lithium nickel cobalt aluminum oxide, lithium iron phosphate, a composite material of lithium iron phosphate and carbon, and their respective modified compounds.

Some embodiments provide a preparation method of a secondary battery, including steps of preparing a negative electrode plate by using the following method: providing a negative-electrode active material, where the negative-electrode active material contains graphite; letting the negative-electrode active material form a negative-electrode slurry; and applying the negative-electrode slurry to at least one surface of a negative-electrode current collector so that the negative-electrode slurry forms a negative-electrode film layer, to obtain the negative electrode plate, where the negative electrode plate satisfies that, when the negative electrode plate and a lithium metal sheet constitute a button battery which is discharged to 5.0 mV at 0.05 C, a capacity increment curve V-dQ/dV of the button battery has a third-order lithiation phase transition peak of graphite at position 0.055V-0.085V.

In a secondary battery obtained by using the preparation method provided in this application, the negative-electrode active material of the negative electrode plate contains graphite, and the negative electrode plate satisfies that, when the negative electrode plate and a lithium metal sheet constitute a button battery which is discharged to 5.0 mV at 0.05 C, a resulting capacity increment curve V-dQ/dV has a third-order lithiation phase transition peak of graphite at position 0.055V-0.085V. In this way, the negative electrode plate can have a relatively high reversible capacity, and also have a relatively high capability of de-intercalating active ions, thereby greatly increasing a moving speed of active ions between a positive electrode and a negative electrode, so that a fast charging capability is significantly improved and a cycle life is significantly prolonged, provided that the secondary battery has a relatively high energy density.

Some embodiments provide a battery module, including the secondary battery in the first aspect of this application, or a secondary battery obtained according to the preparation method in the second aspect of this application.

Some embodiments provide a battery pack, including the battery module in the third aspect of this application.

Some embodiments provide an apparatus, including at least one of the secondary battery in the first aspect of this application, a secondary battery obtained according to the preparation method in the second aspect of this application, the battery module in the third aspect of this application, or the battery pack in the fourth aspect of this application.

The battery module, the battery pack, and the apparatus herein include the secondary battery in accordance with some embodiments, and therefore have at least advantages that are the same as those of the secondary battery.

BRIEF DESCRIPTION OF DRAWINGS

To describe various embodiments more clearly, the following briefly describes the accompanying drawings required for describing the embodiments of this application. Apparently, the accompanying drawings in the following description show merely some embodiments of this application, and a person of ordinary skill in the art may still derive other drawings from the accompanying drawings without creative efforts.

DETAILED DESCRIPTION OF EMBODIMENTS

To make the objectives, technical solutions, and beneficial technical effects of this application clearer, the following further describes this application in detail with reference to the embodiments. It should be understood that the embodiments described in this specification are merely intended to interpret this application, but not intended to limit this application.

For simplicity, only some numerical ranges are explicitly disclosed herein. However, any lower limit may be combined with any upper limit to form a range not expressly recorded; any lower limit may be combined with any other lower limit to form a range not expressly recorded; and any upper limit may be combined with any other upper limit to form a range not expressly recorded. In addition, although not explicitly stated, every site or single value between end sites of a range is included in the range. Therefore, each site or single numerical value can be used as its own lower limit or upper limit in combination with any other site or single numerical value or in combination with other lower or upper limits to form an unspecified range.

In the descriptions herein, it should be noted that "more than" or "less than" is inclusive of the present number and that "more" in "one or more" means two or more than two, unless otherwise specified.

The present disclosure is not intended to describe every possible embodiment or implementation in accordance with the present disclosure. The following description illustrates exemplary embodiments in detail by using examples. Herein, guidance is provided by using a series of embodiments and the embodiments may be used in various combinations. In the examples, enumeration is only representative but should not be interpreted as exhaustive.

Secondary Battery

Embodiments provide a secondary battery. In those embodiments, the secondary battery includes a positive electrode plate, a negative electrode plate, and an electrolyte. In a charging and discharging process of the battery, active ions are intercalated and deintercalated back and forth between a positive electrode and a negative electrode. The electrolyte acts as a medium for ions migration between the positive electrode and the negative electrode.

Negative Electrode Plate

The negative electrode plate in these embodiments includes a negative-electrode current collector and a negative-electrode film layer that is disposed on at least one surface of the negative-electrode current collector and that contains a negative-electrode active material. The negative-electrode active material contains graphite, and the negative electrode plate satisfies that, when the negative electrode plate and a lithium metal sheet constitute a button battery which is discharged to 5.0 microVolt (mV) at 0.05 Celsius (C), a capacity increment curve V-dQ/dV of the button battery has a third-order lithiation phase transition peak of graphite at position 0.055V-0.085V.

Figure 1:
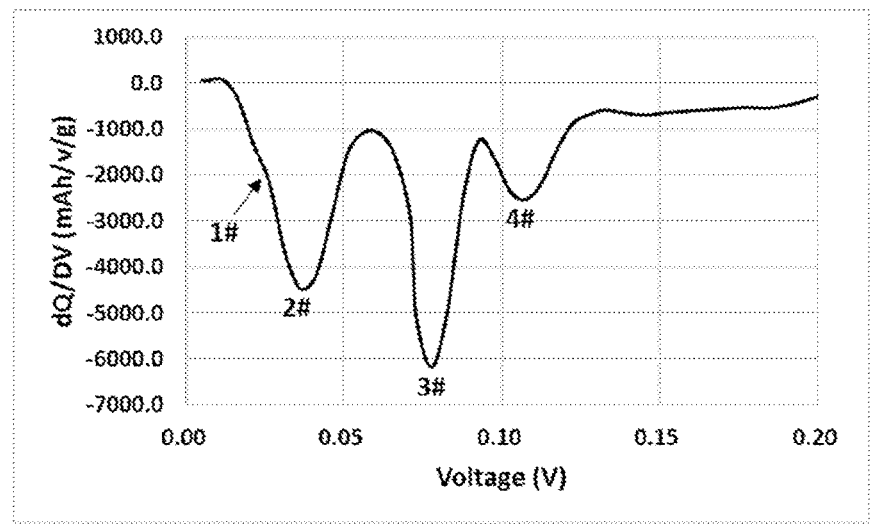
FIG. 1 is a diagram of a capacity increment curve V-dQ/dV of a button battery including a lithium metal sheet and a negative electrode plate of a secondary battery provided in Example 2 of this application when the button battery is discharged to 5.0 mV at 0.05 C.
Figure 2:
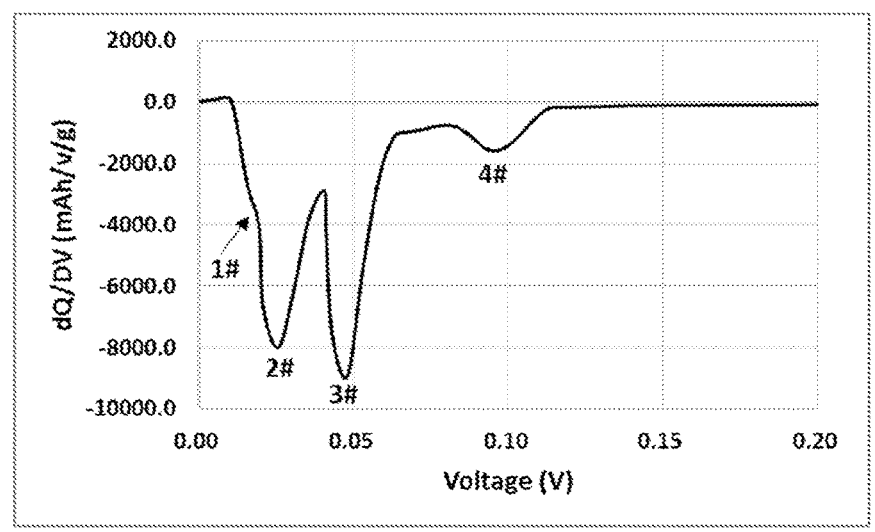
FIG. 2 is a diagram of a capacity increment curve V-dQ/dV of a button battery including a lithium metal sheet and a negative electrode plate of a secondary battery provided in Comparative Example 2 of this application when the button battery is discharged to 5.0 mV at 0.05 C.

A person skilled in the art should know that, in a lithiation reaction process, graphite has four lithiation phase transition peaks (first-order, second-order, third-order, and fourth-order) in the capacity increment curve V-dQ/dV, which correspond to four different phase transition stages of graphite in the lithiation process. In other words, the four lithiation phase transition peaks are external manifestations of lithiation characteristics of the graphite. Specifically, with reference to FIG. 1, the fourth-order lithiation phase transition peak (a peak 4 #) corresponds to a phase transition process of a transition from graphite (C) to a fourth-order graphite intercalation compound ($LiC_{36}$), the third-order lithiation phase transition peak (a peak 3 #) corresponds to a phase transition process of a transition from the fourth-order graphite intercalation compound ($LiC_{36}$) to a third-order graphite intercalation compound ($LiC_{27}$) (hereinafter referred to as a third-order lithiation phase transition process), the second-order lithiation phase transition peak (a peak 2 #) corresponds to a phase transition process of a transition from the third-order graphite intercalation compound ($LiC_{27}$) to a second-order graphite intercalation compound ($LiC_{12}$), and the first-order lithiation phase transition peak (a peak 1 #) corresponds to a phase transition process of a transition from the second-order graphite intercalation compound ($LiC_{12}$) to a first-order graphite intercalation compound ($LiC_6$). A peak position of each order of lithiation phase transition peak of graphite is measured by a voltage corresponding to a peak value of the phase transition peak (in this application, the peak value is the lowest point of the phase transition peak).

The inventor(s) has first found with keen determination that a fast charging capability and a cycle life of a secondary battery using a negative electrode plate can be significantly improved with a relatively high energy density when a negative-electrode active material of the negative electrode plate contains graphite, and the negative electrode plate satisfies that, when the negative electrode plate and a lithium metal sheet constitute a button battery which is discharged to 5.0 mV at 0.05 C (to be specific, the negative electrode plate is lithiated at 0.05 C, until a voltage of the button battery is 5.0 mV), a capacity increment curve V-dQ/dV of the button battery has a third-order lithiation phase transition peak of graphite at position 0.055V-0.085V.

With an intention not to be limited by any theory, the inventors have first found through massive researches that, when a peak position of the third-order lithiation peak is within the foregoing range, the negative electrode plate is more likely to be subject to a lithiation reaction in a third-order lithiation phase change process, and a moving speed of lithium ions between a positive electrode and a negative electrode is greatly increased, so that the fast charging capacity of the secondary battery can be significantly improved. In addition, the battery has relatively small polarization during charging at a high rate, so that capacity utilization and a cycling capacity retention rate of the battery are relatively high. Therefore, the battery using the negative electrode plate can achieve a higher fast charging capability and a longer cycle life with a relatively high energy density.

In some embodiments, optionally, in the capacity increment curve V-dQ/dV of the button battery including the negative electrode plate and the lithium metal sheet when the button battery is discharged to 5.0 mV at 0.05 C, a peak position of the third-order lithiation peak may be at 0.055V-0.083V, 0.057V-0.083V, 0.057V-0.077V, 0.06V-0.082V, 0.06V-0.08V, 0.061V-0.074V, 0.063V-0.083V, 0.063V-0.075V, 0.065V-0.083V, 0.065V-0.080V, 0.065V-0.078V, 0.068V-0.075V, or the like. When the peak position of the third-order lithiation phase transition peak is within the given range, the fast charging capacity of the secondary battery can be further improved, and the cycle life of the secondary battery can be further prolonged.

In some embodiments, in the capacity increment curve V-dQ/dV of the button battery including the negative electrode plate and the lithium metal sheet when the button battery is discharged to 5.0 mV at 0.05 C, a peak intensity of the third-order lithiation peak is −3 Ah/V/g to −15 Ah/V/g. When the peak intensity of the third-order lithiation phase transition peak is within an appropriate range, the negative electrode plate has a relatively high actual lithiation capacity. Therefore, the battery using the negative electrode plate can achieve both a relatively high fast charging capability and a relatively high energy density. Optionally, the peak intensity of the third-order lithiation phase transition peak may be −4 Ah/V/g to −13 Ah/V/g, −5 Ah/V/g to −12 Ah/V/g, −4 Ah/V/g to −10 Ah/V/g, −5 Ah/V/g to −10 Ah/V/g, −5 Ah/V/g to −8 Ah/V/g, or the like.

It should be noted that the "button battery" described in this application is only intended to indicate characteristics of the negative electrode plate of this application. For a preparation process of the button battery, refer to national standards or industry specifications. In an example, the negative electrode plate may be made into a circular electrode plate, a lithium metal disc is used as a counter electrode, and an electrolyte commonly used in the industry is added to prepare a button battery. For example, ethylene carbonate (EC), ethyl methyl carbonate (EMC), and diethyl carbonate (DEC) are uniformly mixed at a volume ratio of 1:1:1 to obtain an organic solvent, and a fully dried lithium salt $LiPF_6$ is uniformly dissolved in the organic solvent to obtain an electrolyte, where a concentration of $LiPF_6$ may be 1 mol/L. A separator is disposed between the negative electrode plate and the lithium metal disc for isolation. The separator may be a separator commonly used in the industry, for example, a polyethylene (PE) separator. The button battery may be a model commonly used in the industry, for example, a CR2430 model. For example, the button battery is assembled in a glove box protected by argon.

The button battery prepared by using the negative electrode plate and the lithium metal sheet are discharged to a voltage of 5.0 mV at 0.05 C at 25° C., and a voltage V and a capacity Q of the battery are collected. A capacity increment dQ/dV corresponding to a unit voltage change (dV) is calculated. Then a capacity increment curve V-dQ/dV is drawn. dQ/dV can be calculated through a SLOPE function in EXCEL by using the collected voltage V and capacity Q data. The unit voltage change dV in this specification may be 0.2V to 0.5V (for example, 0.3V). Herein, testing a capacity and a capacity increment of a negative electrode plate by using a button battery is a method well-known in the art.

The negative electrode plate for preparing the button battery may be sampled in a preparation process of the negative electrode plate, or may be sampled after the secondary battery is disassembled.

It can be understood that the negative-electrode film layer may be disposed on either or both of two surfaces that face each other in a thickness direction of the negative-electrode current collector.

In the negative electrode plate in some embodiments, one or more of a type and a structural parameter (for example, a material structure parameter described in this specification) of the negative-electrode active material, and a structural parameter of the negative electrode plate (for example, an electrode plate structure parameter described in this specification) may be adjusted to control the peak position of the third-order lithiation phase transition peak of graphite in the V-dQ/dV curve within the range given in this application.

In the negative electrode plate in some embodiments, the negative-electrode active material may include one or more of artificial graphite and natural graphite.

In some embodiments, optionally, the negative-electrode active material contains artificial graphite. The artificial graphite in a lithiation process has relatively small volume change. This helps the negative electrode plate maintain relatively high electrolyte infiltration and retention, and lithium ions are more easily diffused across pores in the negative electrode plate, thereby facilitating a lithiation reaction of the graphite, and making the peak position of the third-order lithiation phase transition peak meet a requirement. In addition, the artificial graphite has relatively high structural stability and few side reactions occurred during cycling, so that the battery can achieve a relatively long cycle life.

In some embodiments, optionally, a mass percentage of the artificial graphite in the negative-electrode active material is ≥60%. For example, the mass percentage of the artificial graphite in the negative-electrode active material may be 70% to 100%, 75% to 100%, 80% to 100%, or 90% to 100%.

In some embodiments, the negative-electrode active material may further contain natural graphite. There are many lithiation sites on a surface of the natural graphite, and charge exchange impedance is relatively small. In addition, graphite layers in the natural graphite have a few defects, and lithium ions have a higher solid-phase diffusion capability in the natural graphite. Therefore, when the negative-electrode active material contains an appropriate amount of natural graphite, lithiation reaction performance of graphite can be further improved, improving the fast charging capability of the battery.

In some embodiments, optionally, a mass percentage of the natural graphite in the negative-electrode active material is ≤40%. For example, the mass percentage of the natural graphite in the negative-electrode active material may be 10% to 40%, 20% to 40%, 10% to 30%, or 15% to 25%. When the mass percentage of the natural graphite in the negative-electrode active material is within an appropriate range, the fast charging capability and the cycle life of the secondary battery can be better balanced.

In the negative electrode plate in some embodiments, in addition to the foregoing negative-electrode active material described, optionally, a specific amount of other common negative-electrode active materials may be further included, for example, one or more of soft carbon, hard carbon, a silicon-based material, a tin-based material, and lithium titanate. The silicon-based material may be selected from one or more of elemental silicon, a silicon-oxygen compound, a silicon-carbon composite, and a silicon alloy. The tin-based material may be selected from one or more of elemental tin, a tin-oxygen compound, and a tin alloy.

The negative-electrode active material used in this application may be obtained in a commercial way or through preparation by using a method well-known in the art. In an example, the artificial graphite may be prepared according to the following method: crush petroleum coke, where a median particle size by volume $D_v50$ of a crushed product may be 5 μm to 10 μm, 5.5 μm to 7.5 μm, 6.5 μm to 8.5 μm, or 7.5 μm to 9.5 μm, and shape and grade the crushed petroleum coke to obtain a precursor. Optionally, perform a step of granulating the precursor, where the precursor may be granulated with presence or absence of an organic carbon source to obtain a granulated precursor. Graphitize the precursor at a temperature of 2800° C. to 3200° C. to obtain artificial graphite. Optionally, an organic carbon source may be further used to coat a graphitized product, and carbonization is performed to obtain coating-modified artificial graphite. The organic carbon source used for granulating and coating may be independently selected from materials well-known in the art, for example, asphalt, polyacrylonitrile, epoxy resin, and phenolic resin. Optionally, volatile content of the petroleum coke is 3% to 8% (a mass percentage). Optionally, the petroleum coke contains green petroleum coke.

In some embodiments, a median particle size by volume $D_v50$ of the negative-electrode active material satisfies 8 μm≤$D_v50$≤16 μm. For example, $D_v50$ of the negative-electrode active material may be 8 μm to 14 μm, 8 μm to 11 μm, 10 μm to 14 μm, 9 μm to 15 μm, 9.5 μm to 14.5 μm, or 13 μm to 16 μm. When $D_v50$ of the negative-electrode active material is within an appropriate range, the negative-electrode active material can have a relatively large number of fast lithiation channels, and migration paths of lithium ions in a particle are relatively short, thereby improving lithiation reaction performance of the graphite. In addition, particles in the negative-electrode active material particles are in good contact, and abundant porous structures suitable for electrolyte infiltration can be formed, so that lithiation performance of graphite can be further improved. Therefore, the negative-electrode active material with appropriate $D_v50$ is used, so that the peak position of the third-order lithiation phase transition peak in the V-dQ/dV can satisfy the range given in this application.

When $D_v50$ of the negative-electrode active material is within an appropriate range, side reactions of the electrolyte on a particle surface can be further reduced, and a polarization phenomenon is mitigated, so that the cycle life of the battery can be prolonged. Therefore, optionally, $D_v50$ of the negative-electrode active material may be 9.5 μm to 14.5 μm.

In some embodiments, optionally, the negative-electrode active material includes secondary particles. The inventors have found through researches that, when the negative-electrode active material includes a specific amount of secondary particles, the negative-electrode active material can provide more lithiation channels, so that lithiation reaction performance of the negative-electrode active material can be further improved, thereby helping improve the fast charging capability of the battery. In addition, an expansion effect of the negative electrode plate in a lithiation process can be further mitigated, thereby helps improve the cycle life of the battery. Optionally, a number percentage of the secondary particles in the negative-electrode active material is ≥60%. For example, the number percentage of the secondary particles in negative-electrode active material may be 70% to 100%, 75% to 100%, 80% to 100%, or 90% to 100%.

In some embodiments, optionally, a particle size uniformity (Uniformity) of the negative-electrode active material is 0.3 to 0.4. For example, the particle size uniformity (Uniformity) of the negative-electrode active material may be 0.3 to 0.38, 0.31 to 0.36, 0.32 to 0.4, 0.32 to 0.37, 0.34 to 0.36, or 0.33 to 0.39. It is easy for the negative electrode plate using the negative electrode active material to form a relatively short liquid phase transmission path, thereby further improving the lithiation reaction performance of the graphite, and improving the fast charging capability of the battery. In addition, there may be a relatively large contact area between particles of the negative electrode plate to implement close contact, so that the negative electrode plate achieves a relatively high press density, thereby increasing the energy density of the battery. There can also be a relatively large contact area between the particles and the current collector, so that the negative electrode plate achieves relatively good adhesion, thereby facilitating electron conduction in the negative electrode plate, and improving the lithiation reaction performance of the negative-electrode active material. In addition, film peeling and powder falling risks of the negative electrode plate are also reduced, so that the fast charging capability of the battery can be further improved and the cycle life of the battery can be further prolonged.

In some embodiments, optionally, a particle size span $(D_v90-D_v10)/D_v50$ of the negative-electrode active material may satisfy 1.0≤$(D_v90-D_v10)/D_v50$≤1.4. For example, $(D_v90-D_v10)/D_v50$ of the negative-electrode active material may be 1.0 to 1.3, 1.05 to 1.35, 1.1 to 1.4, 1.1 to 1.3, or 1.15 to 1.25.

$(D_v90-D_v10)/D_v50$ of the negative-electrode active material reflects a degree of a particle size of a relatively large particle and a particle size of a relatively small particle in the negative-electrode active material deviating from the median particle size by volume $D_v50$. Appropriate $(D_v90-D_v10)/D_v50$ of the negative-electrode active material helps particles in the negative-electrode active material achieve a relatively high dispersion uniformity in the negative-electrode film layer, thereby helping the negative-electrode active material in different regions of the negative-electrode film layer achieve relatively high lithiation reaction performance, and improving the fast charging capability of the battery.

In some embodiments, optionally, a degree of graphitization of the negative-electrode active material may be 93% to 95%. For example, the degree of graphitization of the negative-electrode active material may be 93.5% to 94.5%. When the degree of graphitization of the negative-electrode active material is within the given range, the negative-electrode active material can have a relatively high reversible capacity and also have a relatively large spacing between graphite layers, thereby further improving the lithiation performance of the graphite, and improving the fast charging capability of the battery. In addition, the negative-electrode active material has relatively good structural stability in a charging and discharging process, thereby prolonging the cycle life of the battery.

In some embodiments, optionally, a powder OI value of the negative-electrode active material may be 2.5 to 4.5. For example, the powder OI value of the negative-electrode active material may be 3 to 4.2, 3 to 4, or 3.2 to 3.8. The powder OI value of the negative-electrode active material indicates an orientation index of the negative-electrode active material. When the powder OI value of the negative-electrode active material is appropriate, the negative-electrode active material can have a relatively large number of fast lithiation channels, thereby improving the lithiation performance. In addition, when the powder OI value of the negative-electrode active material is within an appropriate range, an expansion effect of the negative electrode plate in a lithiation process can be further mitigated, thereby prolonging the cycle life of the battery.

In some embodiments, optionally, a tap density of the negative-electrode active material is 0.8 g/cm$^3$ to 1.2 g/cm$^3$. For example, the tap density of the negative-electrode active material may be 0.9 g/cm$^3$ to 1.1 g/cm$^3$. When the tap density of the negative-electrode active material is within the given range, the negative-electrode film layer can have a relatively high press density, so that the battery can achieve a relatively high energy density. In addition, good contact is achieved between particles of the negative-electrode active material in the negative-electrode film layer, and a smooth porous structure is also formed, thereby helping improve the lithiation performance of the negative-electrode active material, and improving the fast charging capability of the battery.

In some embodiments, optionally, a powder press density of the negative-electrode active material at a pressure of 30 kN may be 1.65 g/cm$^3$ to 1.85 g/cm$^3$. For example, the powder press density of the negative-electrode active material at the pressure of 30 kN may be 1.7 g/cm$^3$ to 1.8 g/cm$^3$. When the powder press density of the negative-electrode active material at the pressure of 30 kN is within the given range, the negative-electrode film layer can have a relatively high press density, thereby increasing the energy density of the battery.

In some embodiments, optionally, a gram capacity of the negative-electrode active material is 350 mAh/g to 360 mAh/g. For example, the gram capacity of the negative-electrode active material may be 352 mAh/g to 358 mAh/g, or 353 mAh/g to 357 mAh/g. By using a negative-electrode active material within this capacity range, it can be ensured that the battery has a relatively high energy density and fast charging capability.

In some embodiments, optionally, at least part of a surface of the negative-electrode active material has a coating layer. The coating layer can protect the negative-electrode active material, to greatly reduce graphite layer peeling caused by co-intercalation of a solvent, so that the negative-electrode active material has relatively high structural stability, and the secondary battery can achieve a relatively long cycle life.

Optionally, 80% to 100% of the surface of the negative-electrode active material may be covered with a coating layer. Further, 90% to 100% of the surface of the negative-electrode active material may be covered with a coating layer.

Optionally, the coating layer contains amorphous carbon. The coating layer containing amorphous carbon allows faster diffusion of lithium ions in particles, thereby improving the lithiation performance of the negative-electrode active material, and improving the fast charging capability of the battery. Amorphous carbon coating layer may be formed by carbonizing an organic carbon source. For example, the organic carbon source may be selected from high molecular polymers, for example, materials such as coal pitch, petroleum pitch, phenolic resin, and coconut shell.

In the negative electrode plate of this application, the negative-electrode film layer usually includes the negative-electrode active material, an optional binder, an optional conductive agent, and other optional auxiliary agents, and is usually obtained by applying a negative-electrode slurry to the negative-electrode current collector and then performing drying and cold pressing. The negative-electrode slurry is usually formed by dispersing the negative-electrode active material, the optional conductive agent, the optional binder, the optional auxiliary agent, and the like in a solvent and stirring them uniformly. The solvent may be N-methylpyrrolidone (NMP) or deionized water.

In an example, the conductive agent may contain one or more of superconducting carbon, carbon black (for example, Super P, acetylene black, or Ketjen black), carbon dot, carbon nanotube, graphene, and carbon nanofiber.

In an example, the binder may contain one or more of styrene-butadiene rubber (SBR), water-soluble unsaturated resin SR-1B, water-based acrylic resin, polyvinyl alcohol (PVA), sodium alginate (SA), and carboxymethyl chitosan (CMCS).

The other optional auxiliary agents are, for example, a thickener (for example, sodium carboxymethyl cellulose CMC-Na) and a PTC thermistor material.

In some embodiments, optionally, an areal density AD of the negative-electrode film layer satisfies 0.09 kg/m$^2 \leq$AD$\leq$0.117 kg/m$^2$, for example, 0.09 kg/m$^2 \leq$AD$\leq$0.105 kg/m$^2$, 0.09 kg/m$^2 \leq$AD$\leq$0.097 kg/m$^2$, 0.09 kg/m$^2 \leq$AD$\leq$0.095 kg/m$^2$, 0.094 kg/m$^2 \leq$AD$\leq$0.107 kg/m$^2$, 0.095 kg/m$^2 \leq$AD$\leq$0.110 kg/m$^2$, 0.095 kg/m$^2 \leq$AD$\leq$0.105 kg/m$^2$, 0.097 kg/m$^2 \leq$AD$\leq$0.110 kg/m$^2$, or 0.105 kg/m$^2 \leq$AD$\leq$0.117 kg/m$^2$.

The areal density AD of the negative-electrode film layer is a weight of the negative-electrode film layer per unit area. When AD is within the foregoing range, the peak position of the third-order lithiation peak of graphite can be controlled within the range given in this application. In addition, an appropriate areal density can make the negative electrode plate have a relatively high reversible capacity, and reduce a migration distance of lithium ions in the electrode plate, thereby further increasing the energy density and improving the fast charging capability of the battery.

In some embodiments, optionally, a press density PD of the negative-electrode film layer satisfies 1.5 g/m$^3 \leq$PD$\leq$1.7 g/m$^3$, for example, 1.5 g/m$^3 \leq$PD$\leq$1.65 g/m$^3$, 1.5 g/m$^3 \leq$PD$\leq$1.6 g/m$^3$, 1.53 g/m$^3 \leq$PD$\leq$1.68 g/m$^3$, 1.55 g/m$^3 \leq$PD$\leq$1.65 g/m$^3$, 1.55 g/m$^3 \leq$PD$\leq$1.63 g/m$^3$, 1.58 g/m$^3 \leq$PD$\leq$1.63 g/m$^3$, or 1.6 g/m$^3 \leq$PD$\leq$1.7 g/m$^3$.

The press density (PD) of the negative-electrode film layer is a weight of the negative-electrode film layer per unit volume, and is equal to the areal density AD of the negative-electrode film layer divided by a thickness of the negative-electrode film layer. When PD is within the foregoing range, the peak position of the third-order lithiation phase transition peak of graphite can be controlled within the range given in this application. In addition, an appropriate press density can make the negative-electrode film layer achieve relatively high electron conductivity and relatively low liquid phase conduction impedance, thereby further improving the fast charging capability and cycling performance of the battery.

The inventor(s) has found through in-depth researches that, when parameters of the negative-electrode active material and parameters of the negative electrode plate are properly designed, the fast charging capability of the battery can be further improved and the cycle life of the battery can be further prolonged while the secondary has a relatively high energy density.

In some embodiments, optionally, the negative-electrode film layer satisfies all of the following: $D_v50$ of the negative-electrode active material is 8 μm to 11 μm, AD of the negative-electrode film layer is 0.105 kg/m² to 0.117 kg/m², PD of the negative-electrode film layer is 1.5 g/m³ to 1.6 g/m³, and in the V-dQ/dV curve, the peak position of the third-order lithiation phase transition peak of graphite is 0.07V to 0.085V, for example, the peak position of the third-order lithiation phase transition peak of graphite may be 0.07V-0.08V or 0.078V-0.085V.

In some embodiments, optionally, the negative-electrode film layer satisfies all of the following: $D_v50$ of the negative-electrode active material is 10 μm to 14 μm, AD of the negative-electrode film layer is 0.097 kg/m² to 0.110 kg/m², PD of the negative-electrode film layer is 1.55 g/m³ to 1.65 g/m³, and in the V-dQ/dV curve, the peak position of the third-order lithiation phase transition peak of graphite is 0.062V-0.078V, for example, the peak position of the third-order lithiation phase transition peak of graphite may be 0.062V-0.072V or 0.068V-0.078V.

In some embodiments, optionally, the negative-electrode film layer satisfies all of the following: $D_v50$ of the negative-electrode active material is 13 μm to 16 μm, AD of the negative-electrode film layer is 0.09 kg/m² to 0.097 kg/m², PD of the negative-electrode film layer is 1.6 g/m³ to 1.7 g/m³, and in the V-dQ/dV curve, the peak position of the third-order lithiation phase transition peak of graphite is 0.055V-0.067V, for example, the peak position of the third-order lithiation phase transition peak of graphite may be 0.055V-0.06V or 0.059V-0.067V.

In some embodiments, optionally, a porosity P of the negative-electrode film layer satisfies 25%≤P≤45%, for example, 25%≤P≤42%, 28%≤P≤40%, 28%≤P≤38%, 28%≤P≤35%, 30%≤P≤43%, 30%≤P≤40%, or 30%≤P≤38%. When P is within the foregoing range, the negative electrode plate can have proper electrolyte infiltration performance and good reaction interphase, thereby reducing liquid phase impedance of lithium ions migrating in the negative electrode plate, improving the lithiation performance of the negative-electrode active material, and improving the fast charging capability of the battery. In addition, appropriate P can make the negative-electrode film layer have proper electrolyte retention, so that the battery has a relatively light weight, thereby increasing the energy density of the battery.

In some embodiments, optionally, an adhesion F between the negative-electrode film layer and the negative-electrode current collector satisfies 4.5 N/m≤F≤15 N/m, for example, 5 N/m≤F≤14 N/m, 7 N/m≤F≤15 N/m, 6 N/m≤F≤13 N/m, or 8 N/m≤F≤12 N/m. There is relatively large adhesion F between the negative-electrode film layer and the negative-electrode current collector, so that the negative electrode plate has good electron conductivity, thereby helping improve the lithiation performance of the negative-electrode active material. In addition, F further reflects a capability of the negative electrode plate to maintain bonding reliability during cycling. This helps the battery maintain good electron conductivity throughout a life cycle, thereby further improving the cycling performance of the battery.

In the negative electrode plate of this application, the negative-electrode current collector may be made of a material with good electrical conductivity and mechanical strength, for example, copper foil, but is not limited thereto.

In the negative electrode plate of this application, related parameters of a negative-electrode film layer are all parameters of a single-sided negative-electrode film layer. When the negative-electrode film layer is disposed on each of two surfaces of the negative-electrode current collector, this is considered to fall within the protection scope of this application, provided that parameters of a negative-electrode film layer on any one of the surfaces meet the data ranges of this application. In addition, the ranges of the peak position of the third-order lithiation peak of the graphite, the press density PD, the areal density AD, the porosity P, and the adhesion F of the negative-electrode film layer, and the like in this application are all film layer parameters of a negative electrode plate that is compacted through cold pressing and that is used to assemble a battery.

In addition, the negative electrode plate of this application does not exclude additional functional layers other than the negative-electrode film layer. For example, in some embodiments, the negative electrode plate further includes a conductive primer layer (for example, including a conductive agent and a binder) that is sandwiched between the negative-electrode current collector and the negative-electrode film layer and that is disposed on a surface of the negative-electrode current collector. In some other embodiments, the negative electrode plate of this application further includes a protection layer covering the surface of the negative-electrode film layer.

In this application, the median particle size by volume $D_v50$, the particle size uniformity (Uniformity), and the particle size span $(D_v90-D_v10)/D_v50$ of the negative-electrode active material all have meanings well-known in the art, and may be measured by using instruments and methods known in the art. For example, with reference to the GB/T 19077-2016 particle size distribution laser diffraction method, a laser particle size analyzer (for example, Master Size 3000) may be used for measurement.

The particle size uniformity (Uniformity) of the negative-electrode active material may indicate a dispersion degree of particle sizes of all particles in the negative-electrode active material deviating from the median particle size by volume $(D_v50)$ of the negative-electrode active material, and reflect a particle size distribution uniformity of the negative-electrode active material.

The particle size span $(D_v90-D_v10)/D_v50$ of the negative-electrode active material reflects a degree of a particle size of a relatively large particle and a particle size of a relatively small particle in the negative-electrode active material deviating from the median particle size by volume $(D_v50)$.

$D_v10$ indicates a corresponding particle size when a cumulative volume distribution percentage of the negative-electrode active material reaches 10%.

$D_v50$ indicates a corresponding particle size when a cumulative volume distribution percentage of the negative-electrode active material reaches 50%.

$D_v90$ indicates a corresponding particle size when a cumulative volume distribution percentage of the negative-electrode active material reaches 90%.

The degree of graphitization of the negative-electrode active material has a meaning well-known in the art, and may be measured by using an instrument and a method known in the art. For example, an X-ray powder diffractometer (for example, Bruker D8 Discover) may be used to measure a value of $d_{002}$. For the test, refer to JIS K 0131-1996 and JB/T 4220-2011. Then the degree of graphitization G is calculated based on the following formula:

$G=(0.344-d_{002})/(0.344-0.3354)\times 100\%$, where $d_{002}$ is an interlayer spacing measured in nanometers (nm) in a graphite crystal structure.

In the X-ray diffraction analysis test of this application, a copper target may be used as an anode target, a CuKα ray is used as a radiation source, a ray wavelength λ=1.5418 Å, a scanning angle 2θ ranges from 20° to 80°, and a scanning rate may be 4°/min.

The powder OI value of the negative-electrode active material has a meaning well-known in the art, and may be measured by using an instrument and a method known in the art. For example, an X-ray powder diffractometer (for example, Bruker D8 Discover) may be used to obtain an X-ray diffraction pattern of the negative-electrode active material according to JIS K 0131-1996 and JB/T4220-2011. Then the powder OI value of the negative-electrode active material is calculated based on the following formula: the OI value=$C_{004}/C_{110}$, where $C_{004}$ is a peak area of a characteristic diffraction peak of a 004 crystal plane of graphite, and $C_{110}$ is a peak area of a characteristic diffraction peak of a 110 crystal plane of graphite.

The areal density AD of the negative-electrode active material has a meaning well-known in the art, and may be measured by using an instrument and a method known in the art. For example, with reference to the GB/T 5162-2006 standard, a powder tap density tester (for example, the BT-300 model of Bettersize) may be used for convenient measurement.

The powder press density PD of the negative-electrode active material has a meaning well-known in the art, and may be measured by using an instrument and a method known in the art. For example, with reference to the GB/T 24533-2009 standard, an electronic pressure testing machine (for example, the UTM7305 model) may be used for measurement. An example test method is as follows: Weigh 1 g of negative-electrode active material, add it to a mold with a bottom area of 1.327 cm², pressurize it to 3000 kg (equivalent to 30 kN), hold the pressure for 30 s, release the pressure, hold for 10 s, record the data, and then calculate the powder press density of the negative-electrode active material at the pressure of 30 kN.

In this application, a primary particle and a secondary particle both have meanings well known in the art. The primary particle is a non-agglomerated particle. The secondary particle is an agglomerated particle obtained through gathering of two or more primary particles.

A number percentage of the secondary particles in the negative-electrode active material may be tested by using a method known in the art. An example test method is as follows: Lay the negative-electrode active material, bond it to a conductive adhesive to prepare a to-be-tested sample with a length×a width=6 cm×1.1 cm, and test a particle shape by using a scanning electronic microscope (for example, ZEISS Sigma 300). For the test, refer to JY/T 010-1996. To ensure accuracy of a test result, a plurality of (for example, 20) different regions may be randomly selected in the to-be-tested sample for the scanning test, and at a specific magnification rate (for example, 1000 times), a number percentage of the secondary particles in each region in the total number of particles is calculated as a number percentage of the secondary particles in the region. An average value of test results of the plurality of test regions is used as the number percentage of the secondary particles in the negative-electrode active material.

The gram capacity of the negative-electrode active material has a meaning well-known in the art, and may be tested by using a method known in the art. An example test method for the gram capacity of the negative-electrode active material is as follows: uniformly mix the negative-electrode active material, a conductive agent carbon black (Super P), and a binder PVDF at a mass ratio of 91.6:1.8:6.6 with a solvent NMP (N-methylpyrrolidone) to prepare a slurry; and apply the prepared slurry to a copper foil current collector, and dry it in an oven for later use. Use a lithium metal sheet as a counter electrode, and use a polyethylene (PE) film as a separator. Mix ethylene carbonate (EC), ethyl methyl carbonate (EMC), and diethyl carbonate (DEC) at a volume ratio of 1:1:1, and then uniformly dissolve $LiPF_6$ in the foregoing solution to obtain an electrolyte, where a concentration of $LiPF_6$ is 1 mol/L. Assemble a CR2430-type button battery in a glove box protected by argon. Leave the obtained button battery standing for 12 hours, discharge it to 0.005V at a constant current of 0.05 C, leave it standing for 10 minutes, discharge it to 0.005V at a constant current of 50 μA, leave it standing for 10 minutes, discharge it to 0.005V at a constant current of 10 μA, charge it to 2V at a constant current of 0.1 C, and then record the charging capacity. A ratio of the charging capacity to mass of the negative-electrode active material is the gram capacity of the negative-electrode active material.

The areal density of the negative-electrode film layer has a meaning well-known in the art, and may be tested by using a method known in the art. For example, take a single-side coated and cold-pressed negative electrode plate (if a double-side coated negative electrode plate is used, a negative-electrode film layer on one side may be wiped off first), punch it into a small disc with an area of S1, weigh it, and record the weight as M1. Then wipe off a negative-electrode film layer of the weighed negative electrode plate, weigh a negative-electrode current collector, and record the weight as M0. An areal density of the negative-electrode film layer=(the weight M1 of the negative electrode plate−the weight M0 of the negative-electrode current collector)/S1.

The press density of the negative-electrode film layer has a meaning well-known in the art, and may be tested by using a method known in the art. The press density of the negative-electrode film layer=the areal density of the negative-electrode film layer/a thickness of the negative-electrode film layer.

The thickness of the negative-electrode film layer has a meaning well-known in the art, and may be tested by using a method known in the art. For example, a spiral micrometer accurate to 4 decimal places is used.

The porosity of the negative-electrode film layer has a meaning well-known in the art, and may be measured by using an instrument and a method known in the art. For example, with reference to GB/T 24586-2009, a gas replacement method may be used for measurement. An example test method is as follows: Take a single-side coated and cold-pressed negative electrode plate (if a double-side coated negative electrode plate is used, a negative-electrode film layer on one side may be wiped off first), and punch it into a disc sample with a diameter of 14 mm. Test a thickness of a negative-electrode film layer (a thickness of the negative electrode plate−a thickness of a negative-electrode current collector). Calculate an apparent volume V1 of the negative-electrode film layer based on a cylindrical volume calculation formula. Use an inert gas such as helium or nitrogen as a medium, and measure a real volume of the negative electrode plate by using the gas replacement method and a true density tester (for example, the Micromeritics AccuPyc II 1340 model). For the test, refer to GB/T 24586-2009. Subtract a volume of the negative-electrode current collector from the real volume of the negative electrode plate to obtain a real volume V2 of the negative-electrode film layer. A porosity of the negative-electrode film layer=(V1−V2)/V1× 100%. A plurality of (for example, 30) electrode plate samples may be taken for the test, and results are averaged, thereby improving accuracy of the test result.

The adhesion between the negative-electrode film layer and the negative-electrode current collector has a meaning well-known in the art, and may be measured by using an instrument and a method known in the art. Cut the negative electrode plate into a test sample with a length of 100 mm and a width of 10 mm. Take a stainless steel plate with a width of 25 mm, apply a double-sided adhesive tape (with a width of 11 mm) to it, attach the test sample to the double-sided adhesive tape on the stainless steel plate, and roll a 2000 g roller on a surface of the test sample back and forth for three times (300 mm/min). Bend the test sample at 180 degrees, manually peel a negative-electrode film layer of the test sample from a current collector by 25 mm, and fix the test sample on a testing machine (for example, INSTRON 336), so that a peeled surface is consistent with a force line of the testing machine. Cause the testing machine to continuously perform peeling at 30 mm/min. In a resulting peeling force curve, take an average value of a smooth section as a peeling force FO. In this case, an adhesion F between the negative-electrode film layer and the current collector in the test sample=FO/a width of the test sample (a measurement unit of F: N/m).

Positive Electrode Plate

In the secondary battery in accordance with the present disclosure, the positive electrode plate may include a positive-electrode current collector and a positive-electrode film layer that is disposed on at least one surface of the positive-electrode current collector and that includes a positive-electrode active material. For example, the positive-electrode current collector has two surfaces that face each other in a thickness direction of the positive-electrode current collector, and the positive-electrode film layer may be disposed on either of the two surfaces, or may be disposed on both of the two surfaces.

In the secondary battery in accordance with the present disclosure, the positive-electrode active material may be a well-known positive-electrode active material used for a secondary battery in the art. Optionally, the positive-electrode active material may be selected from one or more of lithium transition metal oxide, lithium-containing phosphate with an olivine structure, and their respective modified materials. Optionally, the lithium transition metal oxide may be selected from one or more of lithium cobalt oxide, lithium nickel oxide, lithium manganese oxide, lithium nickel manganese oxide, lithium nickel cobalt manganese oxide, lithium nickel cobalt aluminum oxide, and their respective modified materials. Optionally, the lithium-containing phosphate with the olivine structure may be selected from one or more of lithium iron phosphate, a composite material of lithium iron phosphate and carbon, lithium manganese phosphate, a composite material of lithium manganese phosphate and carbon, lithium iron manganese phosphate, a composite material of lithium iron manganese phosphate and carbon, and their respective modified materials. The modified material may be obtained by performing coating modification and/or doping modification on a material. One type of these positive-electrode active materials may be used alone, or two or more types may be used in combination.

In some embodiments, the positive-electrode active material may contain one or more of lithium nickel cobalt manganese oxide, lithium nickel cobalt aluminum oxide, lithium iron phosphate, a composite material of lithium iron phosphate and carbon, and their respective modified compounds. For example, the positive-electrode active material may contain one or more of lithium nickel cobalt manganese oxide, lithium nickel cobalt aluminum oxide, and their respective modified compounds.

In the secondary battery in accordance with the present disclosure, the positive-electrode film layer usually includes the positive-electrode active material, an optional binder, and an optional conductive agent, and is usually obtained by applying a negative-electrode slurry and then performing drying and cold pressing. The positive-electrode slurry is usually formed by dispersing the positive-electrode active material, the optional conductive agent, the optional binder, and the like in a solvent and stirring them uniformly. The solvent may be N-methylpyrrolidone (NMP).

In an example, the binder used for the positive-electrode film layer may contain one or more of polyvinylidene fluoride (PVDF) and polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylic resin.

In an example, the conductive agent used for the positive-electrode film layer may contain one or more of superconducting carbon, carbon black (for example, Super P, acetylene black, or Ketjen black), carbon dot, carbon nanotube, graphene, and carbon nanofiber.

In the secondary battery in accordance with the present disclosure, the positive-electrode current collector may be made of a material with good electrical conductivity and mechanical strength, for example, copper foil, but is not limited thereto.

[Electrolyte]

In the secondary battery in accordance with the present disclosure, a type of the electrolyte is not specifically limited, and the electrolyte may be selected according to a requirement. The electrolyte may be selected from at least one of a solid electrolyte and a liquid electrolyte.

In some embodiments, the electrolyte may be an electrolyte salt. The electrolyte salt includes an electrolyte lithium salt and a solvent.

Optionally, the lithium salt may be selected from one or more of $LiPF_6$ (lithium hexafluorophosphate), $LiBF_4$ (lithium tetrafluoroborate), $LiClO_4$ (lithium perchlorate), $LiAsF_6$ (lithium hexafluoroborate), LiFSI (lithium bis(fluorosulfonyl)bisfluorosulfonyl imide), LiTFSI (lithium bistrifluoromethanesulfonimidetrifluoromethanesulfon imide), LiTFS (lithium trifluoromethanesulfonat), LiDFOB (lithium difluorooxalatoborate), LiBOB (lithium bisoxalatoborate), $LiPO_2F_2$ (lithium difluorophosphate), LiDFOP (lithium difluorophosphate), and LiTFOP (lithium tetrafluoro oxalate phosphate).

Optionally, the solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methylmethyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), tetramethylene sulfone (SF), methyl sulfone (MSM), ethyl methyl sulfone (EMS), and diethyl sulfone (ESE).

In some embodiments, optionally, the electrolyte salt further includes an additive. For example, the additive may contain a negative-electrode film forming additive, or may contain a positive-electrode film forming additive, or may contain an additive capable of improving some performance of a battery, for example, an additive for improving overcharge performance of the battery, an additive for improving high-temperature performance of the battery, and an additive for improving low-temperature performance of the battery.

[Separator]

In some embodiments, the secondary battery further includes a separator. The separator is disposed between the positive electrode plate and the negative electrode plate for isolation. In the secondary battery in accordance with the present disclosure, a type of the separator is not particularly limited, and any well-known porous separator used for a secondary battery may be selected. For example, the separator may be selected from one or more of glass fiber film, non-woven film, polyethylene film, polypropylene film, polyvinylidene fluoride film, and a multilayer composite film that contains one or more of them.

In some embodiments, the secondary battery may include an outer package. The outer package is used to package the positive electrode plate, the negative electrode plate, and the electrolyte.

In some embodiments, the outer package of the secondary battery may be a hard shell, for example, a hard plastic shell, an aluminum shell, or a steel shell. The outer package of the secondary battery may be alternatively a soft shell, for example, a soft bag. A material of the soft package may be plastic, for example, one or more of polypropylene (PP), polybutylene terephthalate (PBT), polybutylene succinate (PBS), and the like.

The secondary battery may be prepared by using a method well-known in the art. For example, the positive electrode plate, the separator, and the negative electrode plate made into an electrode assembly through winding or lamination, where the separator is sandwiched between the positive electrode plate and the negative electrode plate for isolation; and the electrode assembly is placed in the outer package, and the electrolyte is injected, followed by sealing, to obtain the secondary battery.

Figure 3:
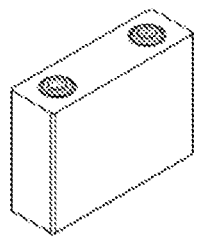
FIG. 3 is a schematic diagram of an embodiment of a secondary battery.

This application does not impose special limitations on a shape of the secondary battery, and the secondary battery may be of a cylindrical shape, a square shape, or any other shapes. FIG. 3 shows a secondary battery 5 of a square structure as an example.

Figure 4:
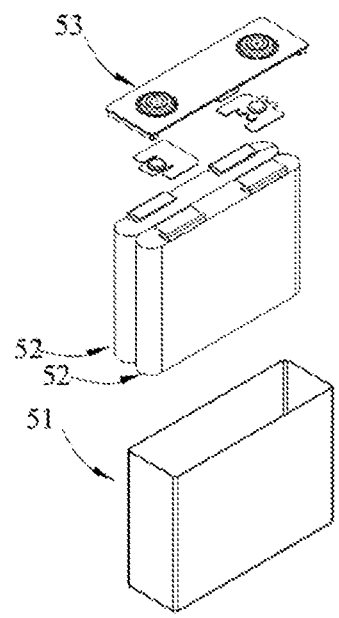
FIG. 4 is an exploded view of FIG. 3.

In some embodiments, with reference to FIG. 4, the outer package may include a housing 51 and a cover plate 53. The housing 51 may include a base plate and a side plate connected onto the base plate, and the base plate and the side plate enclose an accommodating cavity. The housing 51 has an opening communicating with the accommodating cavity, and the cover plate 53 can cover the opening to close the accommodating cavity. A positive electrode plate, a negative electrode plate, and a separator may be made into electrode assembly 52 through winding or lamination. The electrode assembly 52 is packaged in the accommodating cavity. The electrolyte is infiltrated in the electrode assembly 52. There may be one or more electrode assemblies 52 in the secondary battery 5, and the quantity may be adjusted as required.

In some embodiments, such secondary batteries may be combined to assemble a battery module. The battery module may include a plurality of secondary batteries whose quantity may be adjusted according to the use case and capacity of the battery module.

Figure 5:
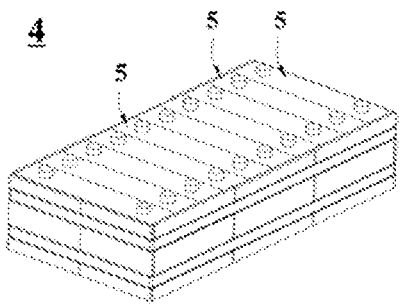
FIG. 5 is a schematic diagram of an embodiment of a battery module.

FIG. 5 shows a battery module 4 used as an example. With reference to FIG. 5, in the battery module 4, a plurality of secondary batteries 5 may be sequentially arranged in a length direction of the battery module 4. Certainly, the secondary batteries may alternatively be arranged in any other manner. Further, the plurality of secondary batteries 5 may be fastened through fasteners.

Optionally, the battery module 4 may further include a housing with an accommodating space, and the plurality of secondary batteries 5 are accommodated in the accommodating space.

In some embodiments, battery modules may be further assembled into a battery pack, and a quantity of battery modules included in the battery pack may be adjusted based on application and capacity of the battery pack.

Figure 6:
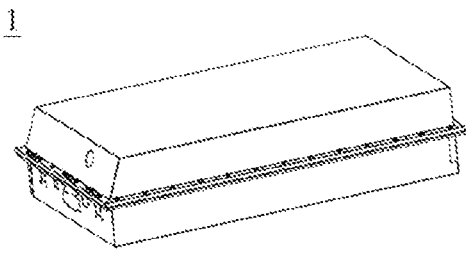
FIG. 6 is a schematic diagram of an embodiment of a battery pack.
Figure 7:
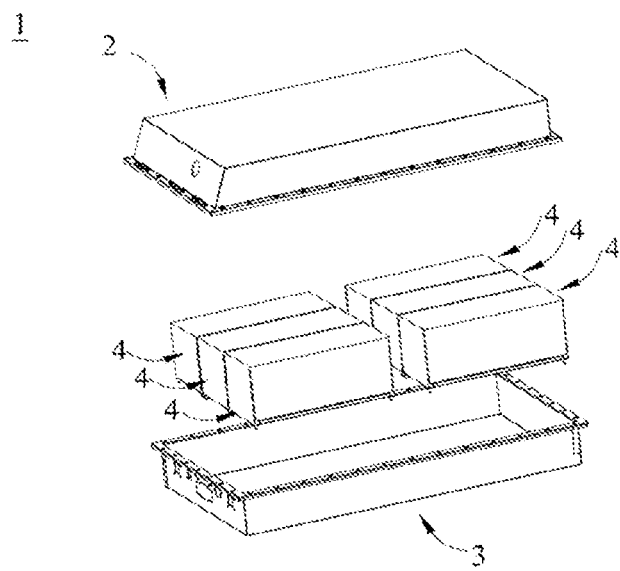
FIG. 7 is an exploded view of FIG. 6.

FIG. 6 and FIG. 7 show a battery pack 1 used as an example. With reference to FIG. 6 and FIG. 7, the battery pack 1 may include a battery box and a plurality of battery modules 4 arranged in the battery box. The battery box includes an upper box body 2 and a lower box body 3. The upper box body 2 can cover the lower box body 3 to form enclosed space for accommodating the battery modules 4. The plurality of battery modules 4 may be arranged in the battery box in any manner.

Apparatus

Another aspect of this application provides an apparatus. The apparatus includes at least one of the secondary battery, the battery module, or the battery pack provided in this application. The secondary battery may be used as a power source of the apparatus, and may also be used as an energy storage unit of the apparatus. The apparatus may be, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, and the like.

A secondary battery, a battery module, or a battery pack may be selected for the apparatus according to requirements for using the apparatus.

Figure 8:
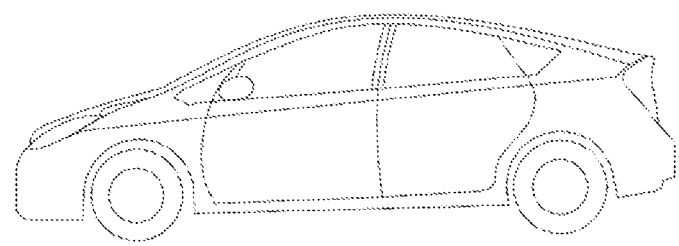
FIG. 8 is a schematic diagram of an embodiment of an apparatus using a secondary battery as a power source.

FIG. 8 shows an apparatus used as an example. The apparatus is a battery electric vehicle, a hybrid electric vehicle, a plug-in hybrid electric vehicle, or the like. To meet a requirement of the apparatus for high power and high energy density of the secondary battery, a battery pack or a battery module may be used.

In another example, the apparatus may be a mobile phone, a tablet computer, a notebook computer, or the like. The apparatus is usually required to be light and thin, and the secondary battery may be used as a power source.

EXAMPLES

Examples below more specifically describe the content of this application, which are only used for explanatory description. It is apparent for a person skilled in the art to make various modifications and variations within the scope of the content disclosed in this application. Unless otherwise stated, all parts, percentages, and ratios reported in the following examples are based on weight, all reagents used in the embodiments are commercially available or synthesized in a conventional manner, and can be used directly without further treatment, and all instruments used in the embodiments are commercially available.

1. Preparation of Negative-Electrode Active Material

The negative-electrode active material in examples of this application may be commercially purchased or prepared by the following method.

1. Artificial graphite A may be prepared according to the following method: Take green petroleum coke with a volatile content of 10%, and crush it to obtain a green petroleum coke raw material with a median particle size by volume $D_v50$ is 6.5 μm. Shape and grade the green petroleum coke raw material to obtain a precursor. Mix the precursor with 5% pitch, perform granulating at 600° C., and then perform graphitization at a temperature of 3000° C. Coat a graphitization product with pitch, and perform carbonization to obtain the artificial graphite A. A median particle size by volume $D_v50$ of the artificial graphite A is controlled at 9.5 μm, a particle size uniformity (Uniformity) is controlled at 0.36, and a gram capacity is controlled at 352 mAh/g.

2. Artificial graphite B may be prepared according to the following method: Take green petroleum coke with a volatile content of 8%, and crush it to obtain a green petroleum coke raw material with a median particle size by volume $D_v50$ is 7.5 μm. Shape and grade the green petroleum coke raw material to obtain a precursor. Mix the precursor with 8% pitch, perform granulating at 600° C., and then perform graphitization at a temperature of 3000° C. Coat a graphitization product with pitch, and perform carbonization to obtain the artificial graphite B. A median particle size by volume $D_v50$ of the artificial graphite B is controlled at 12 μm, a particle size uniformity (Uniformity) is controlled at 0.34, and a gram capacity is controlled at 355 mAh/g.

3. Artificial graphite C may be prepared according to the following method: Take green petroleum coke with a volatile content of 6%, and crush it to obtain a green petroleum coke raw material with a median particle size by volume $D_v50$ is 8.5 μm. Shape and grade the green petroleum coke raw material to obtain a precursor. Mix the precursor with 10% pitch, perform granulating at 600° C., and then perform graphitization at a temperature of 3000° C. Coat a graphitization product with pitch, and perform carbonization to obtain the artificial graphite C. A median particle size by volume $D_v50$ of the artificial graphite C is controlled at 14.5 μm, a particle size uniformity (Uniformity) is controlled at 0.34, and a gram capacity is controlled at 358 mAh/g.

4. Natural graphite: The natural graphite was purchased from BTR New Material Group Co., Ltd., a model was AGP-8-3, a median particle size by volume $D_v50$ was approximately 12.5 μm, a particle size uniformity (Uniformity) is approximately 0.41, and a gram capacity is 364 mAh/g.

2. Preparation of Battery

Example 1

Preparation of Negative Electrode Plate

The negative-electrode active material artificial graphite (A), a binder styrene-butadiene rubber (SBR), a thickener sodium carboxymethyl cellulose (CMC-Na), and a conductive agent carbon black (Super P) were fully stirred and mixed in an appropriate amount of deionized water at a weight ratio of 96.2:1.8:1.2:0.8 to form a uniform negative-electrode slurry. The negative-electrode slurry was applied to a surface of a negative-electrode current collector copper foil, followed by drying, cold pressing, slitting, and cutting, to obtain a negative electrode plate. A press density of the negative electrode plate was 1.53 g/cm³, and an areal density was 0.107 kg/m².

Preparation of Positive Electrode Plate

A positive-electrode active material lithium nickel cobalt manganese oxide LiNi0.5Co0.2Mn0.302 (NCM523), a conductive agent carbon nanotube (CNT), a conductive agent carbon black (Super P), and a binder PVDF were fully stirred and mixed in an appropriate amount of solvent NMP at a weight ratio of 97.5:0.5:0.9:1.1 to form a uniform positive-electrode slurry. The positive-electrode slurry was applied to a surface of a positive-electrode current collector aluminum foil, followed by drying and cold pressing, to obtain a positive electrode plate. An areal density of a positive-electrode film layer was 0.178 kg/m², and a press density was 3.4 g/cm³.

Separator

A polyethylene (PE) film was used.

Preparation of Electrolyte

Ethylene carbonate (EC), ethyl methyl carbonate (EMC), and diethyl carbonate (DEC) were mixed at a volume ratio of 1:1:1, and then $LiPF_6$ was uniformly dissolved in the foregoing solution to obtain an electrolyte, where a concentration of $LiPF_6$ was 1 mol/L.

Preparation of Secondary Battery

The positive electrode plate, the separator, and the negative electrode plate were stacked in sequence, and a reference electrode was added between the separator and the negative electrode plate (the reference electrode was used for subsequent performance testing of a battery sample, a lithium sheet, a lithium metal wire, or the like may be selected, and the reference electrode should be separated by the separator to avoid contact with either of a positive electrode and a negative electrode). The stack was wound to obtain an electrode assembly. The electrode assembly was placed into an outer package and the electrolyte was added, followed by processes including packaging, standing, formation, and aging, to obtain a secondary battery.

Preparation methods of Examples 2 to 10 and Comparative Examples 1 to 4 are similar to those of Example 1, but design parameters of the negative electrode plate and the positive electrode plate were adjusted. For details about different product parameters, see Table 2.

Tests (1) Test of Phase Transition Peak Position of Graphite

Preparation of button battery: The negative electrode plate in the foregoing examples and comparative examples was taken, a lithium metal sheet was used as a counter electrode, and a polyethylene (PE) film was used as a separator. Ethylene carbonate (EC), ethyl methyl carbonate (EMC), and diethyl carbonate (DEC) were mixed at a volume ratio of 1:1:1, and then $LiPF_6$ was uniformly dissolved in the foregoing solution to obtain an electrolyte, where a concentration of $LiPF_6$ was 1 mol/L. A CR2430-type button battery was assembled in a glove box protected by argon.

The obtained button battery was left standing for 8 hours at 25° C., and then was discharged to a voltage of 5.0 mV at a constant current of 0.05 C, and voltage and capacity data was collected. Then dQ/dV was calculated by using a SLOPE function in EXCEL, where a unit voltage change dV was 0.3V. A capacity increment curve V-dQ/dV was drawn to obtain a peak position of a corresponding phase transition peak.

(2) Test of Fast Charging Capability

The secondary battery prepared in the examples and comparative examples was charged to a charge cut-off voltage of 4.4V at a constant current of 0.33 C at 25° C., then charged to a current of 0.05 C at a constant voltage, left standing for 5 minutes, and then discharged to a discharge cut-off voltage of 2.8V at a constant current of 0.33 C, and its actual capacity was recorded as $C_0$.

Then the battery was charged to a full-battery charge cut-off voltage of 4.4V or a negative-electrode cut-off potential of 0V (whichever came first) at constant currents of 0.5 $C_0$, 1 $C_0$, 1.5 $C_0$, 2 $C_0$, 2.5 $C_0$, 3 $C_0$, 3.5 $C_0$, 4 $C_0$, and 4.5 $C_0$ in sequence. Each time after charging was completed, the battery needed to be discharged to a full-battery discharge cut-off voltage of 2.8V at 1 $C_0$. Negative-electrode potentials corresponding to 10% SOC (State of Charge, state of charge), 20% SOC, 30% SOC, . . . , and 80% SOC at different charging rates were recorded. Rate/negative-electrode potential curves in different SOCs were drawn, and linear fitting was performed to obtain charging rates corresponding to a negative-electrode potential of 0V in different SOCs. The charging rates were charging windows in the SOCs, and were denoted as $C_{10\%\ SOC}$, $C_{20\%\ SOC}$, $C_{30\%\ SOC}$, $C_{40\%\ SOC}$, $C_{50\%\ SOC}$, $C_{60\%\ SOC}$, $C_{70\%\ SOC}$, and $C_{80\%\ SOC}$. Charging duration T (min) in which the battery was charged from 10% SOC to 80% SOC was calculated based on the following formula: $(60/C_{20\%\ SOC}+60/C_{30\%\ SOC}+60/C_{40\%\ SOC}+60/C_{50\%\ SOC}+60/C_{60\%\ SOC}+60/C_{70\%\ SOC}+60/C_{80\%\ SOC})\times 10\%$. A shorter time indicates a higher fast charging capability of the battery.

(3) Test of Cycle Life

The secondary battery prepared in the examples and comparative examples was charged to a charge cut-off voltage of 4.4V at a constant current of 0.33 C at 25° C., then charged to a current of 0.05 C at a constant voltage, left standing for 5 minutes, and then discharged to a discharge cut-off voltage of 2.8V at a constant current of 0.33 C, and its initial capacity was recorded as $C_0$. Then the battery was charged according to a policy described in Table 1 and discharged at 0.33 C, and a discharge capacity $C_n$ of each cycle was recorded, until a cycle capacity retention rate ($C_n/C_0\times 100\%$) is 80%. The number of cycles was recorded. More cycles indicate a longer cycle life of the battery.

TABLE 1

| State of charge SOC of battery | Charging rate (C) |
|---|---|
| 0 to 10% | 0.33 |
| 10% to 20% | 6.5 |
| 20% to 30% | 5 |
| 30% to 40% | 4.5 |
| 40% to 50% | 3.5 |
| 50% to 60% | 3 |
| 60% to 70% | 2.5 |
| 70% to 80% | 2 |
| 80% to 100% | 0.33 |

Test results of examples and comparative examples are shown in Table 2.

TABLE 2

| Number | Positive electrode plate Areal density of film layer (kg/m²) | Negative electrode plate Negative-electrode active material | Areal density of film layer (kg/m²) | Press density of film layer (g/cm³) | Third-order lithiation phase transition peak position (V) | Secondary battery Fast charging capability (min) | Cycles |
|---|---|---|---|---|---|---|---|
| Example 1 | 0.178 | Artificial graphite A | 0.107 | 1.53 | 0.083 | 7.3 | 2536 |
| Example 2 | 0.178 | Artificial graphite A | 0.107 | 1.58 | 0.077 | 7.6 | 2603 |
| Example 3 | 0.193 | Artificial graphite A | 0.117 | 1.50 | 0.079 | 7.5 | 2552 |
| Example 4 | 0.169 | Artificial graphite B | 0.101 | 1.58 | 0.074 | 8.3 | 2822 |
| Example 5 | 0.169 | Artificial graphite B | 0.101 | 1.63 | 0.065 | 9.5 | 2765 |
| Example 6 | 0.150 | Artificial graphite C | 0.09 | 1.70 | 0.055 | 12 | 2407 |
| Example 7 | 0.159 | Artificial graphite C | 0.094 | 1.63 | 0.061 | 10.5 | 2689 |
| Example 8 | 0.159 | Artificial graphite C | 0.094 | 1.68 | 0.057 | 11.8 | 2610 |
| Example 9 | 0.159 | 80% artificial graphite C + 20% natural graphite | 0.094 | 1.63 | 0.067 | 9.2 | 2323 |
| Example 10 | 0.159 | 60% artificial graphite C + 40% natural graphite | 0.094 | 1.63 | 0.073 | 8.6 | 2068 |
| Comparative Example 1 | 0.178 | Artificial graphite A | 0.107 | 1.45 | 0.092 | 6.8 | 735 |
| Comparative Example 2 | 0.159 | Artificial graphite B | 0.096 | 1.50 | 0.094 | 6.6 | 603 |
| Comparative Example 3 | 0.178 | Artificial graphite B | 0.109 | 1.70 | 0.043 | 16.3 | 284 |
| Comparative Example 4 | 0.159 | Artificial graphite C | 0.090 | 1.75 | 0.048 | 14.7 | 547 |

It can be learned from the results in Table 2 that the secondary battery could achieve both a relatively high fast charging capability and a relatively long cycle life when the negative-electrode active material of the negative electrode plate contained graphite and the negative electrode plate satisfied: when the button battery including the negative electrode plate and the lithium metal sheet was discharged to 5.0 mV at 0.05 C, a capacity increment curve V-dQ/dV of the button battery had a third-order lithiation peak of graphite at position 0.055V-0.085V.

In particular, when the V-dQ/dV curve had a third-order lithiation peak of graphite at position 0.061V-0.074V, the fast charging capability of the battery was further improved and the cycle life of the battery was further prolonged.

Because Comparative Examples 1 to 4 do not satisfy the foregoing condition, the battery cannot balance the fast charging capability and the cycle life.

Only the lithium nickel cobalt manganese oxide (NCM523) is used as an example for the positive-electrode active material in the examples of this application. A person skilled in the art may select different positive-electrode active materials based on an actual use environment of the battery. For example, one or more of other types of lithium nickel cobalt manganese oxide (for example, NCM622 and NCM811), lithium nickel cobalt aluminum oxide, lithium iron phosphate, a composite material of lithium iron phosphate and carbon, and their respective modified compounds may be selected. When the negative electrode plate described in this application is used in combination with the foregoing positive-electrode active material, similar improvement effects can be achieved. Details are not described herein again.

The foregoing descriptions are merely specific embodiments of this application, but are not intended to limit the protection scope of this application. Any equivalent modifications or replacements readily figured out by a person skilled in the art within the technical scope disclosed in this application shall fall within the protection scope of this application. Therefore, the scope of protection of this application shall be subject to the scope of protection of the claims.

What is claimed is:

1. A lithium ion secondary battery, comprising a cathode, an anode, a separator, and an electrolyte, wherein the anode comprises a negative electrode plate, wherein the negative electrode plate comprises a negative-electrode current collector and a negative-electrode film layer that is disposed on at least one surface of the negative-electrode current collector and that comprises a negative-electrode active material, the negative-electrode active material containing graphite, wherein the graphite comprises artificial graphite, wherein a median particle size by volume $D_v50$ of the negative-electrode active material satisfies 8 μm≤$D_v50$≤16 μm, wherein an areal density (AD) of the negative-electrode film layer satisfies 0.09 kg/m²≤AD≤0.117 kg/m², wherein a press density (PD) of the negative-electrode film layer satisfies 1.53 g/m³≤PD≤1.68 g/m³, wherein the negative electrode plate satisfies the following:
    when the negative electrode plate and a lithium metal sheet constitute a button battery which is discharged to 5.0 millivolts (mV) at 0.05 Coulomb (C), a capacity increment curve V-dQ/dV of the button battery has a third-order lithiation phase transition peak of graphite at position 0.055 volts (V)-0.085V.

2. The secondary battery according to claim 1, wherein the capacity increment curve V-dQ/dV has the third-order lithiation phase transition peak of graphite at position 0.057V-0.077V.

3. The secondary battery according to claim 1, wherein a peak intensity of the third-order lithiation phase transition peak of graphite is −3 Ah/V/g to −15 Ah/V/g.

4. The secondary battery according to claim 1, wherein the median particle size by volume $D_v50$ of the negative-electrode active material satisfies 9.5 μm≤$D_v50$≤14.5 μm.

5. The secondary battery according to claim 1, wherein the areal density (AD) of the negative-electrode film layer satisfies 0.094 kg/m²≤AD≤0.107 kg/m².

6. The secondary battery according to claim 1, wherein a mass percentage of the artificial graphite in the negative-electrode active material is ≥60%.

7. The secondary battery according to claim 1, wherein the negative-electrode active material contains natural graphite; and wherein a mass percentage of the natural graphite in the negative-electrode active material is ≤40%.

8. The secondary battery according to claim 1, wherein the negative-electrode active material comprises secondary particles; and wherein a number percentage of the secondary particles in the negative-electrode active material is ≥60%.

9. The secondary battery according to claim 1, wherein a particle size uniformity of the negative-electrode active material is 0.3 to 0.4.

10. The secondary battery according to claim 1, wherein the negative-electrode active material further satisfies one or more of the following:
    (1) a particle size span $(D_v90-D_v10)/D_v50$ of the negative-electrode active material satisfies 1.0≤$(D_v90-D_v10)/D_v50$≤1.4;
    (2) a degree of graphitization of the negative-electrode active material is 93% to 95%;
    (3) a powder OI value of the negative-electrode active material is 2.5 to 4.5;
    (4) a tap density of the negative-electrode active material is 0.8 g/m³ to 1.2 g/m³;
    (5) a powder press density of the negative-electrode active material at a pressure of 30 kN is 1.65 g/m³ to 1.85 g/m³; and
    (6) a gram capacity of the negative-electrode active material is 350 mAh/g to 360 mAh/g.

11. The secondary battery according to claim 1, wherein the negative-electrode film layer satisfies one or more of the following:
    (1) a porosity P of the negative-electrode film layer satisfies 25%≤P≤45%; and
    (2) an adhesion F between the negative-electrode film layer and the negative-electrode current collector satisfies 4.5 N/m≤F≤15 N/m.

12. The secondary battery according to claim 1, wherein the cathode comprises a positive electrode plate, the positive electrode plate comprising a positive-electrode current collector and a positive-electrode film layer that is disposed on at least one surface of the positive-electrode current collector and that comprises a positive-electrode active material, and the positive-electrode active material containing one or more of lithium nickel cobalt manganese oxide, lithium nickel cobalt aluminum oxide, lithium iron phosphate, a composite material of lithium iron phosphate and carbon.

13. A battery module, comprising the secondary battery according to claim 1.

14. A battery pack, comprising the battery module according to claim 13.

15. The secondary battery according to claim 6, wherein the mass percentage of the artificial graphite in the negative-electrode active material is 80% to 100%.

16. The secondary battery according to claim 7, wherein the mass percentage of the natural graphite in the negative-electrode active material is 10% to 30%.

17. The secondary battery according to claim 8, wherein the number percentage of the secondary particles in the negative-electrode active material is 80% to 100%.

18. The secondary battery according to claim 9, wherein the particle size uniformity of the negative-electrode active material is 0.31 to 0.36.

* * * * *